US006178882B1

(12) United States Patent
Wagner et al.

(10) Patent No.: US 6,178,882 B1
(45) Date of Patent: Jan. 30, 2001

(54) SHEARING COMPACTOR PUMP

(75) Inventors: Richard Wagner, Waterloo; David Johnston, Elora, both of (CA)

(73) Assignee: Enviro-Care Kruncher Corporation, Waterloo (CA)

(*) Notice: Under 35 U.S.C. 154(b), the term of this patent shall be extended for 0 days.

(21) Appl. No.: 09/252,914

(22) Filed: Feb. 19, 1999

(51) Int. Cl.⁷ .............................. B30B 9/00; B30B 5/00
(52) U.S. Cl. .................... 100/98 R; 100/53; 100/240; 100/245; 100/902
(58) Field of Search .................. 100/53, 98 R, 100/127, 240, 245, 249, 902, 250

(56) References Cited

U.S. PATENT DOCUMENTS

| | | | |
|---|---|---|---|
| 3,580,166 | * 5/1971 | Longo | 100/98 R |
| 3,948,163 | * 4/1976 | Ligh | 100/250 |
| 4,417,510 | * 11/1983 | Sharp | 100/98 R |
| 4,459,906 | * 7/1984 | Cound et al. | 100/98 R |
| 4,691,628 | * 9/1987 | Simpson | 100/98 R |
| 4,885,899 | * 12/1989 | Hutchinson | 100/127 |
| 5,146,848 | * 9/1992 | Dufour | 100/127 |
| 5,269,352 | * 12/1993 | Gold | 100/127 |
| 5,566,610 | * 10/1996 | Robinson et al. | 100/98 R |

FOREIGN PATENT DOCUMENTS

| | | | |
|---|---|---|---|
| 0020040 | * 12/1980 | (EP) | 100/98 R |
| 3-128198 | * 5/1991 | (JP) | 100/902 |
| 5-277796 | * 10/1993 | (JP) | 100/902 |

OTHER PUBLICATIONS

"We're Krunching the Problem . . . " Brochure by Enviro–Care Kruncher Corp. 1997.
Drawings A to E—Large Kruncher & Plate Assembly—Enviro–Care Kruncher Corp.

* cited by examiner

Primary Examiner—Peter Vo
Assistant Examiner—Louis F. Huynh
(74) Attorney, Agent, or Firm—Riches, McKenzie & Herbert

(57) ABSTRACT

A compactor for containers containing flowable materials in which the containers are compacted in a compaction chamber and flowable materials from the containers are recovered in a controlled manner as by extrusion from the compaction chamber. The compactor advantageously includes a shearing mechanism to assist in controlling the feeding of containers into the compaction chamber and/or the release of the container's contents. The containers are preferably compacted under sufficiently high pressures to rupture the containers and force any flowable materials out of the containers. A collection manifold is preferably provided in sealed communication with the compaction chamber to receive flowable materials extruded from the compaction chamber. A filter or screening mechanism capable of withstanding the pressures generated in the compactor is provided to permit flowable materials to be extruded out of the compaction chamber, yet maintaining the ruptured containers in the compaction chamber. The collection manifold allows flowable materials to be recovered in a sealed, enclosed manner for seal delivery as to gas/liquid and/or solid separators for fractioning of the flowable materials into different fractions for storage.

15 Claims, 6 Drawing Sheets

SHEARING COMPACTOR PUMP

SCOPE OF THE INVENTION

This invention relates to waste compactors and more particularly to waste compactors for handling both containers and their contents.

BACKGROUND OF THE INVENTION

In many industries, products in containers must be disposed, preferably with the product to be recovered separately from the containers, as for separate reuse or disposal. For example, in the food industry, canned products which is old stock, of questionable quality or stale dated such as soup paste, stew, dog food and the like may be desired to be separated from their cans for disposal of the cans and reuse or separate recycling of the food products. The metal cans may be recycled with other metal. The food may be reused as human or animal food or recycled as biodegradable refuse.

As another example, in the paint industry, containers of paint may be desired to be discarded with the paint separated from the containers. However, difficulties rise in separating the paint from the containers themselves, and the difficulties are particularly acute when the paint containers are full.

Problems particularly exist in the disposal and recycling of pressurized containers, notably aerosol containers of products, such as, paint, hairspray, deodorants, insecticides, butane, natural gas, propane and the like. With such pressurized containers, explosion hazards arise not only by reason of the container being pressurized but also due to the flammable nature of their contents including not only the products but also various propellents which are used. The explosion hazards are increased when the containers are full. Previously known systems for compacting containers have the disadvantage of being unable to handle pressurized containers, such as, aerosol containers, particularly when the containers are substantially filled with their products.

Previously known systems for compacting containers have the disadvantage of being unable to handle the substantial quantities of product which are in full containers in a manner which permits the product to be separated from the containers themselves.

SUMMARY OF THE INVENTION

To at least partially overcome these disadvantages of previously known devices, the present invention provides an apparatus for compacting containers and separating flowable contents of the containers from the containers themselves, preferably in an enclosed environment. To accommodate hazardous contents, the apparatus may be configured to be explosion proof. The apparatus provides for compaction of the containers under conditions which rupture the containers, compact the containers in a compaction chamber and extrude flowable contents from the containers and out of the compaction chamber.

It is an object of the present invention to provide an apparatus and method for compacting containers and recovering separately from the containers flowable materials from the containers. It is a further object to compact aerosol containers and recover separately the flowable materials including gases from the aerosol containers.

Another object is to provide a novel compactor which provides for compacting of containers and for controlled recovery and containment of flowable materials from the compacted containers by extrusion of the flowable materials.

Another object is to provide an apparatus and method for compacting aerosol containers and for the safe recovery of their contents.

The present invention provides a compactor for containers containing flowable materials in which the containers are compacted in a compaction chamber and flowable materials from the containers are recovered in a controlled manner as by extrusion from the compaction chamber. The compactor advantageously includes a shearing mechanism to assist in controlling the feeding of containers into the compaction chamber and/or the release of the container's contents. The containers are preferably compacted under sufficiently high pressures to rupture the containers and force any flowable materials out of the containers. A collection manifold is preferably provided in sealed communication with the compaction chamber to receive flowable materials extruded from the compaction chamber. A filter or screening mechanism capable of withstanding the pressures generated in the compactor is provided to permit flowable materials to be extruded out of the compacting chamber, yet maintaining the ruptured containers in the compaction chamber. The collection manifold allows flowable materials to be recovered in a sealed, enclosed manner for seal delivery as to gas/liquid and/or solid separators for fractioning of the flowable materials into different fractions for storage.

The present invention provides a method of operating a compactor so as to compact containers and extrude from the containers flowable materials from the containers. The method may be carried out so as to conveniently handle flowable materials from substantially filled containers as by extruding the flowable materials from the containers within an enclosed collection manifold. The method provides for separation of the containers and the flowable materials from the containers under enclosed conditions so as to permit recovery of both flowable gas and liquid/solid materials from the containers. The method may be carried out in manners so as to reduce the loss of gases to the atmosphere and to reduce the risk of fire and explosion.

In one aspect, the present invention provides an apparatus for compacting containers containing flowable material, the apparatus comprising:

a housing having containment walls defining an elongate guideway therein having a forward end and a rear end, the guideway having a substantially uniform cross-sectional shape throughout its length, a ram member reciprocally movable longitudinally in the guideway between a forward extended position proximate the forward end and a rear retraced position proximate the rear end, the ram member having a cross-sectional shape corresponding to that of the guideway such that the ram member substantially seals the guideway against passage of flowable material in the guideway rearwardly pass the ram member, a feed opening through the containment walls into the guideway at a location immediate the forward end and the rear end such that when the ram member in the rear retracted position the feed opening is forward of the ram member, the feed opening permitting containers to be fed into the guideway, a shear member comprising a fixed shear member located in the guideway proximate a forwardmost edge of the feed opening, the fixed shear member opposed to a forward end of the ram member whereby on movement of the ram member forwardly from the rear retracted position, the forwardmost edge of the ram member passes adjacent the fixed shear member to shear any containers which extend from the guideway out of the feed opening, the guideway forward of the feed opening comprising a compaction chamber, the containment walls about the compaction chamber having an array of small size openings which permit flowable materials from the containers to pass therethrough out of the compaction chamber yet substantially permit containers or sheared parts of containers to pass therethrough, wherein with the ram member located within the compaction chamber, the compaction chamber forward of the ram member is substantially sealably enclosed but for the openings, the openings providing communication from the compaction chamber into an enclosed collection manifold outside the compaction chamber, the collection manifold in communication with an outlet conduit, the ram member on movement forwardly in the compaction chamber adapted to compact containers therein and extrude flowable materials from the containers out of the compaction chamber via the openings into the collection chamber and out of the collection chamber via the outlet conduit.

BRIEF DESCRIPTION OF THE DRAWINGS

Further aspects and advantages of the invention will become apparent from the following description taken together with the accompanying drawings, in which.

DETAILED DESCRIPTION OF THE DRAWINGS

Figure 1:
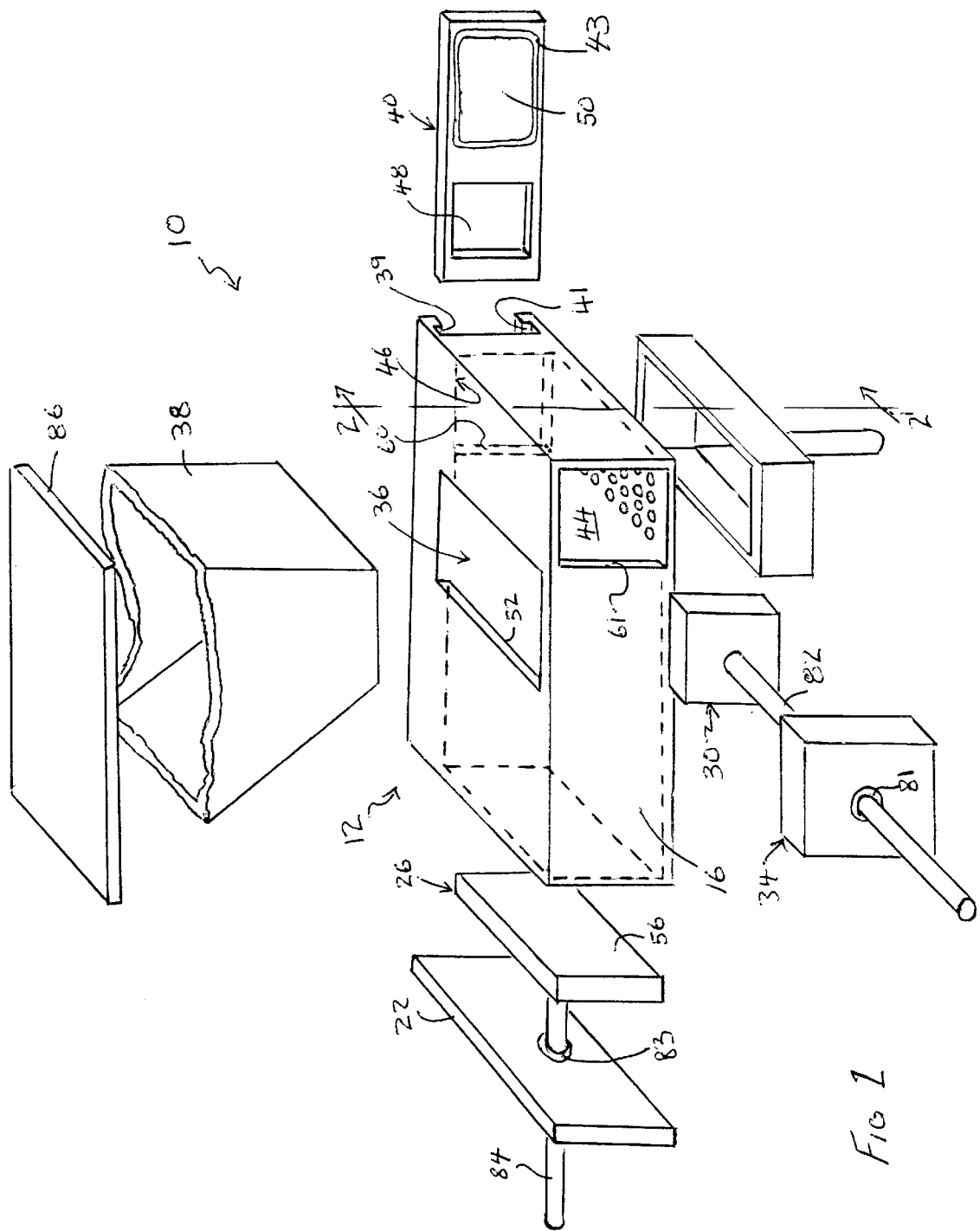
FIG. 1 is an exploded view of a schematic compacting apparatus in accordance with a first aspect of the invention.

Reference is first made to FIGS. 1 to 5 which schematically show a compactor 10 in accordance with the first aspect of the present invention. Compactor 10 has a housing 12 formed by top plate 14, inlet side plate 16, bottom plate 18, outlet side plate 20, rear end plate 22 and forward end plate 23. A guideway 24 is formed internally within the housing 12. A primary piston or ram 26 is slidable in the guideway 24 forwardly and rearwardly between the rear end plate 22 and the forward end plate 23. The ram 26 is controlled by a hydraulic primary cylinder 28 mounted to rear end plate 22.

The top plate 14 has a feed opening 36 for entry of containers 62 into the guideway 24 from a hopper 38 secured to the top plate 14 to overlie the feed opening 36. The containers 62 are shown in dashed lines in the Figures.

A secondary piston 30 is slidable transversely in guideway 24 between side plates 16 and 20. The piston 30 is controlled by a hydraulic secondary cylinder 32 mounted on an extension box 34 which in turn is mounted to inlet side plate 16.

Inlet side plate 16 and outlet side plate 20 have inlet opening 44 and outlet opening 46, respectively, at their ends adjacent the front end plate 23. The inlet opening 44 and outlet opening 46 are sized to permit the piston 30 to slide therethrough from the extension box 34. A slide gate 40 is located in longitudinal sliding relation against the exterior of outlet side plate 20 by reason of the slide gate 40 being received in upwardly and downwardly opening guideways 39 and 41 in extensions of the top plate 14 and the bottom plate 18 beyond the outlet side plate 20. The slide gate 40 has an outlet port 48 of a size at least as large as the outlet opening 46. By sliding the slide gate 40 longitudinally, the outlet port 48 can be brought into registry with the outlet opening 46. During compaction, the slide gate 40 is in a position such that its solid portion 50 sealably closes the outlet opening 46. The slide gate 40 is referred to as being in an open position when the outlet port 48 is brought into registry with the outlet opening 46. The slide gate 40 is referred to as being in a closed position when the solid portion 50 sealably closes the outlet opening 46.

Figure 2:
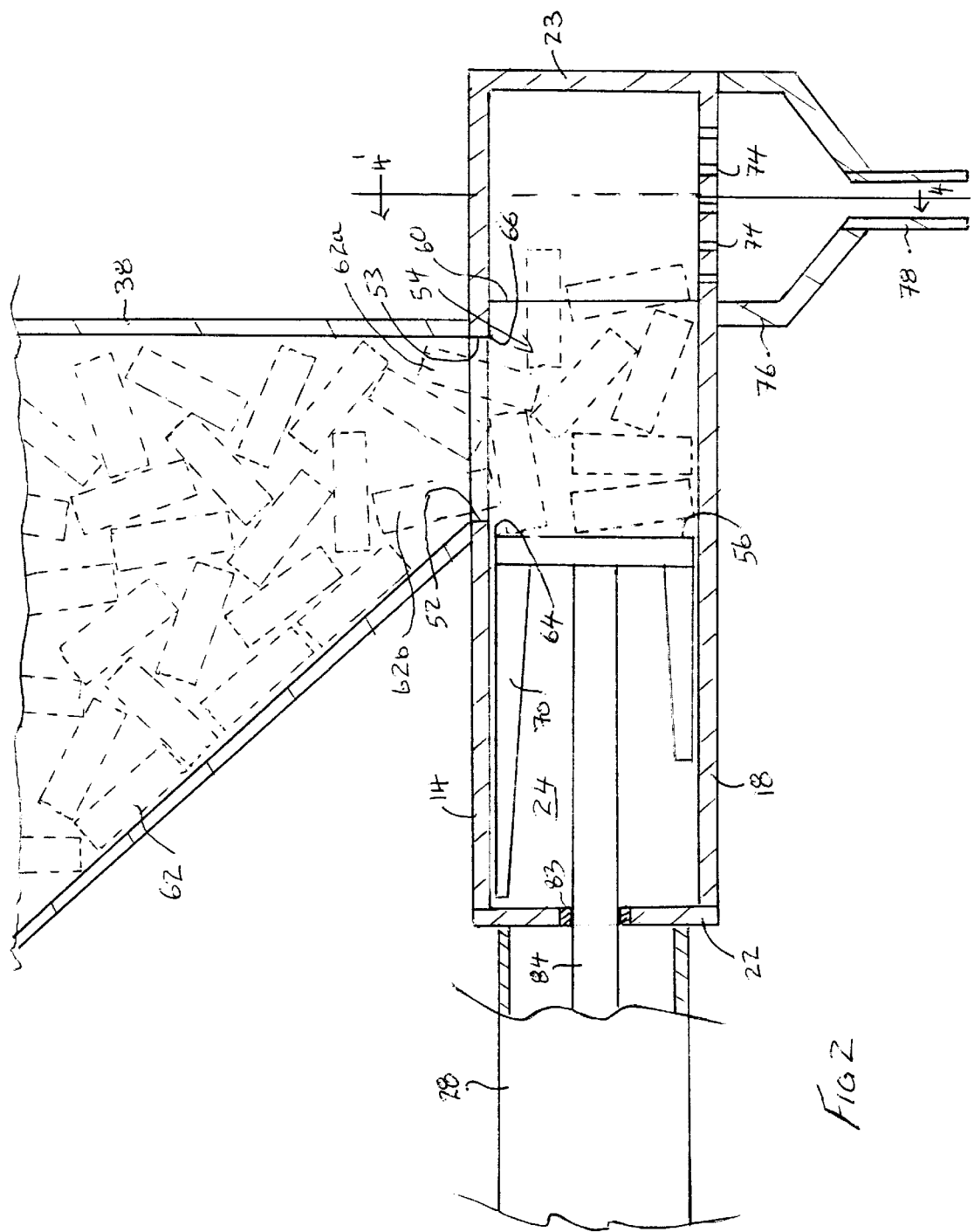
FIG. 2 is a schematic cross-sectional side view of the apparatus of FIG. 1 along center longitudinal line 2–2' with the ram in a retracted position showing a primary hydraulic cylinder.
Figure 5:
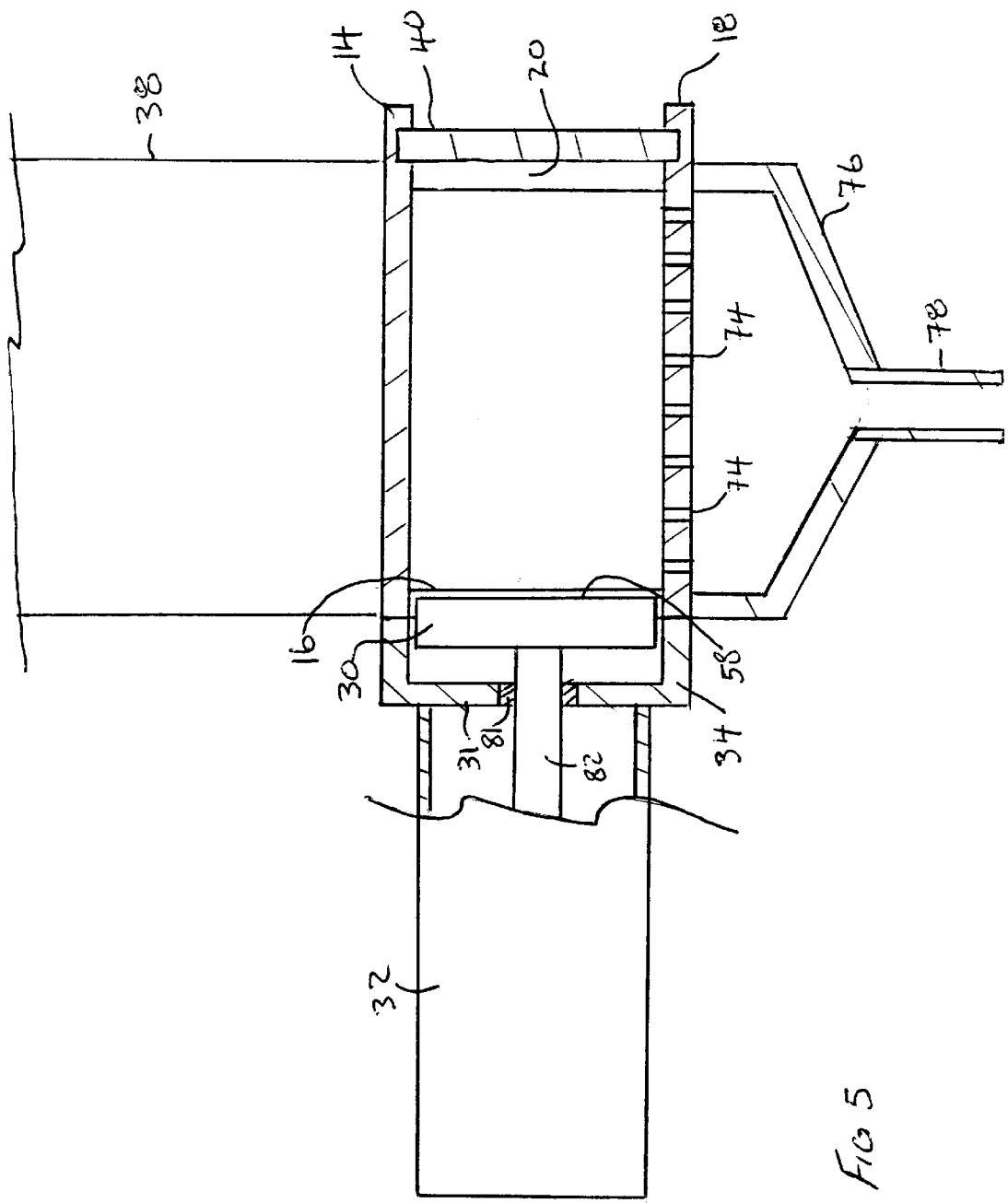
FIG. 5 is a schematic cross-sectional end view of the apparatus of FIG. 2 along section 4–4' also showing a secondary hydraulic cylinder.

The piston 30 is in a retracted position when the piston 30 is in a position substantially as shown in FIG. 5 with the piston face 58 substantially in line with or outside of the interior surface of the inlet side plate 16. The ram 26 is referred to as being in a retracted position when it is retracted to have its ram face 56 rearwardly beyond the rear wall 52 of the feed opening 36 as shown in FIG. 2. The ram 26 is referred to as being in an ejection position as shown in FIG. 3 when its ram face 56 is generally in line with the rear edges 60 and 61 of the outlet opening 46 and inlet opening 44, respectively.

Use of the apparatus is now described. With the apparatus empty of containers and materials, the ram 26 is placed in the retracted position and the piston 30 is placed in the retracted position. Containers 62 are placed in the hopper 38 so as to be fed by gravity into a collection chamber 54 as seen in FIG. 2 defined in the guideway 24 forwardly of the ram face 56. The ram 26 is then extended forwardly from the position of FIG. 2 to compact containers notably against the front end plate 23. As the ram 26 is advanced from the position of FIG. 2 to the position of FIG. 3, the forward upper edge 64 of the ram face 56 and the forward lower edge 66 of the forward wall 53 of the feed opening 36 cooperate to shear off any containers 62 caught therebetween. The ram 26 as shown in FIGS. 2 and 3 carries a rearwardly extending flange 70 with a closure surface 71 (not shown in FIG. 1) which closes the feed opening 36 as the ram 26 moves forwardly.

Figure 3:
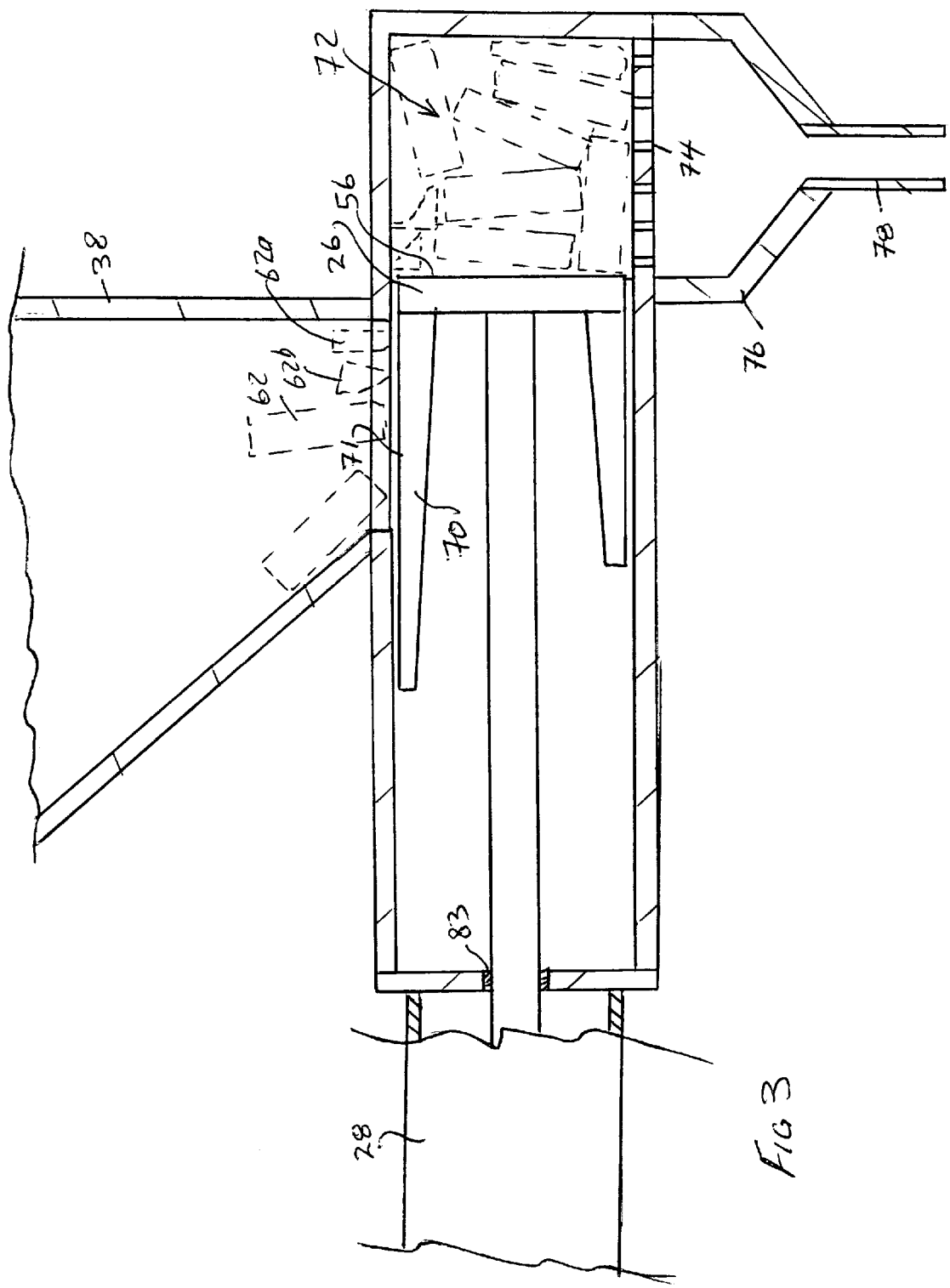
FIG. 3 is a side view, which is the same as that in FIG. 2, however, with the ram in an ejection position.
Figure 4:
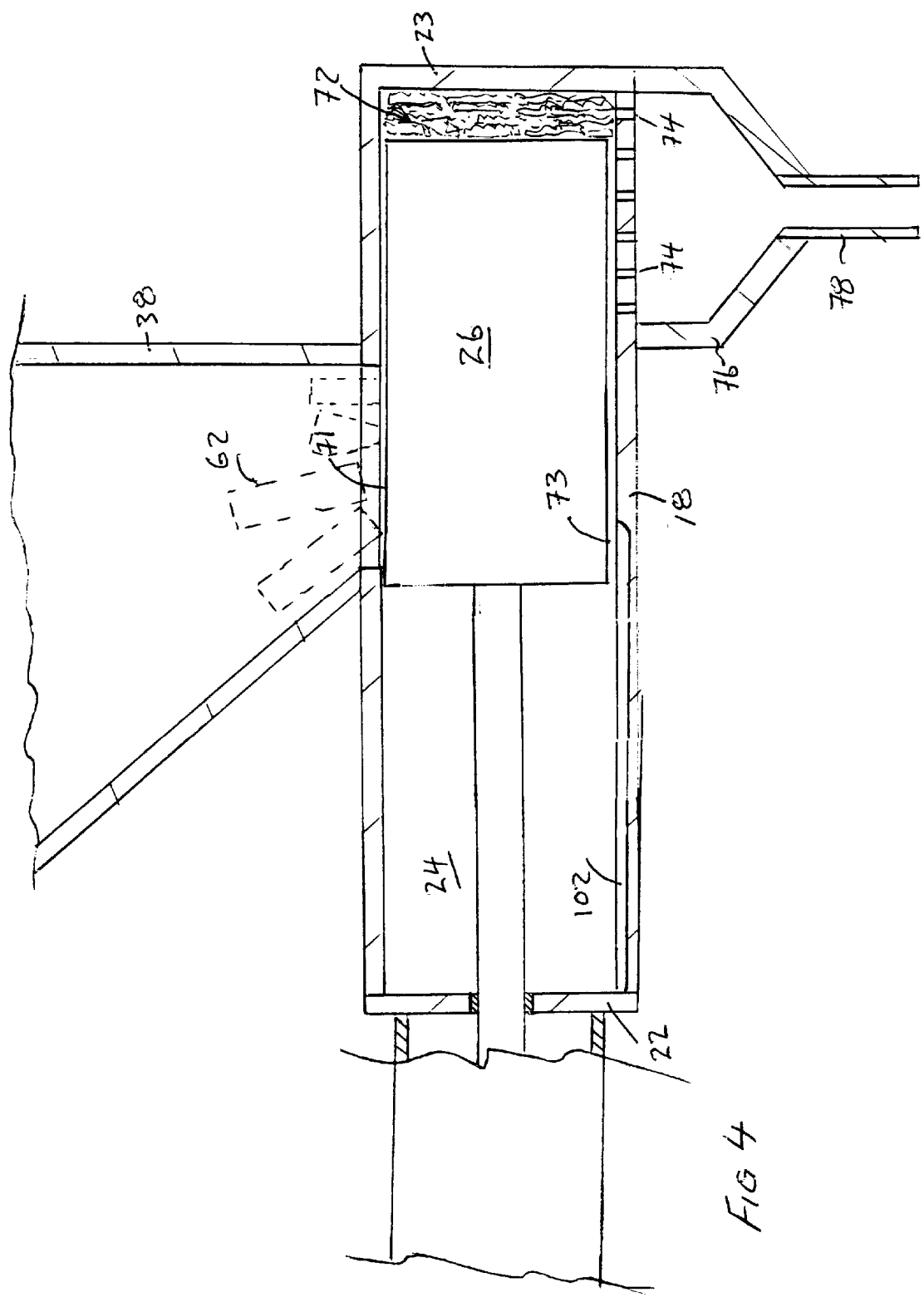
FIG. 4 is a side view, which is the same as that in FIG. 2, however showing a modified ram and with the ram proximate the extended position.

FIG. 3 shows a position in which the ram 26 has been moved forwardly of the feed opening 36 shearing into two parts any containers 62 such as containers 62a and 62b which have been caught in the nip between the ram 26 and the forward wall 53 of the feed opening. The ram 26 is shown in FIG. 3 in the ejection position in which the ram face 56 is substantially in alignment with rear edge 60 of the outlet opening 46. With the piston 30 in the retracted position and the slide gate 40 in the closed position, a compaction chamber 72 is defined as a forward portion of the guideway 24 bounded by the ram 26, top plate 14, bottom plate 18, forward end plate 23, piston 30 and slide gate 40. From the ejection position of FIG. 3, the ram 26 can be advanced forwardly towards the forward end plate 23 to compact the containers 62 within the compaction chamber 72 to an extent as great as possible having regard to the pressure which can be developed by the ram cylinder 28. For example, FIG. 4 shows the ram 26 advanced towards an extended position with containers 62 compacted between the ram 26 and rear end plate 23.

Within the compaction chamber 72, the bottom plate 18 is shown as having a plurality of apertures 74 therethrough. An enclosed collection manifold 76 is secured in sealed relation underneath the bottom plate 18 to receive and deliver material passing through the apertures 74 to an exit conduit 78.

On the ram 26 compacting the containers 62, flowable materials within the containers 62 are forced from the containers 62, and extruded from the compaction chamber 72 out of the apertures 74, through the collection manifold 76 and out of the exit conduit 78.

After compacting, the containers 62 in the compaction chamber 72 to a maximum extent, the ram 26 is withdrawn to the retracted position. Further containers 62 drop into the collection chamber 54 and the ram 26 is again advanced, shearing any containers 62 caught in the nip and subsequently compacting the containers within the compaction chamber 72 with additional flowable materials 80 to be extruded out of the apertures 74. The ram 26 is cycled in this manner a sufficient number of times until the compaction chamber 72 is substantially filled by compressed containers 62. At this time, the ram 26 is positioned in the ejection position as shown in FIG. 3, the slide gate 40 is slid longitudinally to place it in the open position and the piston 30 is then activated to move from its retracted position towards the outlet side plate 20 so as to eject the compacted containers 62 from the compaction chamber 72 through the aligned outlet opening 46 and outlet port 48.

While not necessary, as an alternate method of operation, after any stroke of compacting with the ram 26, the piston 30 can be operated with the slide gate 40 closed and the ram 26 in the ejection position so as to compact the containers 62 transversely within the compaction chambers 72 with additional extrusion of flowable materials out of the apertures 74.

The preferred embodiment illustrated in the drawings merely shows apertures 74 in the bottom plate 18 for exit of the flowable materials. However, similar apertures may also be provided in other containment walls of the compaction chamber 72 as, for example, in the top plate 14, the rear end plate 22 and the slide gate 40. Wherever apertures may be provided for exit of flowable materials from the compaction chamber 72, suitable collection manifolds should be provided to sealably collect extruded flowable materials and direct them as to the exit conduit 78.

To provide for advantageous operation of the apparatus, the ram 26 should form a substantially fluid impermeable seal with the bordering surfaces of the guideway 24, preferably at least in the compaction chamber 72 such that under the high pressures generated in the compaction chamber 72, flowable materials will be extruded out of the apertures 74 rather than to any substantial extent be extruded rearwardly pass the ram 26. This can advantageously be accomplished with the guideway having a uniform cross-sectional shape throughout its length and with the ram 26 to have a closely corresponding cross-sectional shape. By manufacturing the ram 26 and housing 12 to small tolerances of construction and providing surfaces of the various components of the apparatus which engage to be wear resistant surfaces, fluid impermeable sealing can be achieved. Preferably, surfaces may comprise replaceable elements of hardened metal.

When the slide gate 40 is in the closed position the slide gate seals the outlet opening 46 substantially against the flow of any flowable materials therethrough. This can be accomplished by manufacturing to small tolerance and/or by providing suitable gaskets or seals such as a sealing tube 43 shown in FIG. 1. While not shown in the drawings, a mechanical mechanism such as a further hydraulic cylinder preferably is provided so as to slide the slide gate 40 between its open and closed position for automated control of the apparatus.

The extension box 34 preferably is secured to the housing 12 in a sealed manner. A fluid impermeable seal preferably is provided as by an annular seal ring 81 where a rod 82 of the piston 30 passes through the extension box 34 to the secondary hydraulic cylinder 32. Similarly, a fluid impermeable seal 83 preferably is provided where a rod 84 connecting the ram 26 to the ram cylinder 28 passes through rear end plate 22.

Insofar as some of the flowable materials might pass rearwardly of the ram 26, the housing 12 preferably provides the guideway 26 to be totally sealed and enclosed other than at the feed opening 36, the inlet 44 and outlet opening 46. Of course, the inlet opening 44 is to be sealably closed by extension box 34 and outlet opening 46 is sealably closed by gate 40. Any flowable materials 80 which may pass rearwardly of the ram 26 will be retained within the housing 12.

The embodiment illustrated in FIGS. 2 and 3 shows closure surface 71 carried on the ram 26 to close the feed opening 36 as the ram 26 moves therepast. A separate closure gate could sealably close the feed opening 36 if desired. FIG. 4 shows a modification of the ram 26 to be extended rearwardly from its ram face 56 as a rectangular block with the closure surface 71 as an upper surface of the block. A lower surface 73 of the ram 26 is advantageous and serves to close the apertures 74 as the ram 26 is extended forwardly therepast so as to prevent flowable materials from passing rearwardly past the ram 26.

While the ram 26 is to be adapted to substantially totally prevent any flowable materials from passing rearwardly past the ram 26 in the guideway, the ram 26 in FIG. 4 is useful in the event that flowable materials may come to be rearward of the ram 26 in the guideway. The ram 26 as illustrated in FIG. 4 is adapted to be withdrawn fully rearwardly into the front end plate 22 so as to pressurize any flowable materials therebetween. The bottom plate 18 as illustrated in FIG. 4 is provided with a central groove 102 through which such flowable materials are to be extruded forwardly to the front of ram face 56 when the ram 26 is near the front end plate 22. Similarly, to the extent that flowable material came to be between the piston 30 and the extension box 34, retraction of the piston 30 from the extended position towards the slide wall 31 of extension box 34 could permit flowable materials caught therebetween to be extruded back into the compaction chamber 72.

The apertures 74 are to be selected to be of a size which accommodates the objectives of retaining the containers 62 within the compaction chamber 72 yet permitting flowable materials to be extruded from the compaction chamber. Typical containers such as tin cans containing food, plastic containers containing food, pressurized aerosol packages of metal, paint cans and the like are compressed in a manner such that other than in shearing of the container into two pieces on initial movement of the ram, during compaction of the containers, the containers remain substantially as one piece. For example, with typical dog food product packaged in metal cans, there is only a small probability that small portions of any cans may become detached from the remainder of the can. More typically, a container is either sheared into substantial portions or on compression, the container ruptures at some location such that the metal container remains as one connected, yet ruptured, piece from which flowable materials in the container can then be extruded from the container. For the extrusion of food products such as paste-like dog food from cans, apertures having a diameter in the range of 1/16 inch (1.6 mm) to 1/2 inch (13 mm) have been found satisfactory. The pressures generated by the ram 26 should be sufficient to compact the containers 62 in question and preferably to rupture the containers. Preferably, pressures generated by the ram 26 in the compaction chamber will be in the range of about 200 to 3000 pounds per square inch.

Having regard to the nature of the flowable material in the containers, the relative size of the exit conduit 78 should be selected such that the pressures generated in the compaction chamber 72 are adequate to extrude the flowable material both through the apertures 74 and through the exit conduit 78. Preferably, the resistance to flow through the exit conduit 78 will be less than the resistance to flow through the apertures 74.

The relative size of the collection chamber 54 and the compaction chamber 72 can be selected having regard to the size and nature of the containers to be compacted. The forward movement of the ram 26 has the ability to shear off any containers which are not fully received within the collection chamber. Thus, to the extent, it may be advantageous to shear all or a substantial portion of the containers before their compaction, the guideway 24 could be selected to be of a size to ensure such shearing occurs having regard to the size of the containers. Similarly, to the extent that it is desired that substantially all or most of the containers not be sheared and only be ruptured as by compaction pressure within the compaction chamber 72, suitable sizing and/or vibration of the hopper during feeding and the like could be adopted so as to minimize shearing of the containers. Generally, shearing of the containers is found to be advantageous.

FIG. 1 shows the hopper 38 as including a lid 86 to seal a hopper such that the entirety of the space defined within the hopper and the guideway 24 can be sealably closed. This is particularly advantageous and permits advantageous use with containers containing gases or volatile substances.

Figure 6:
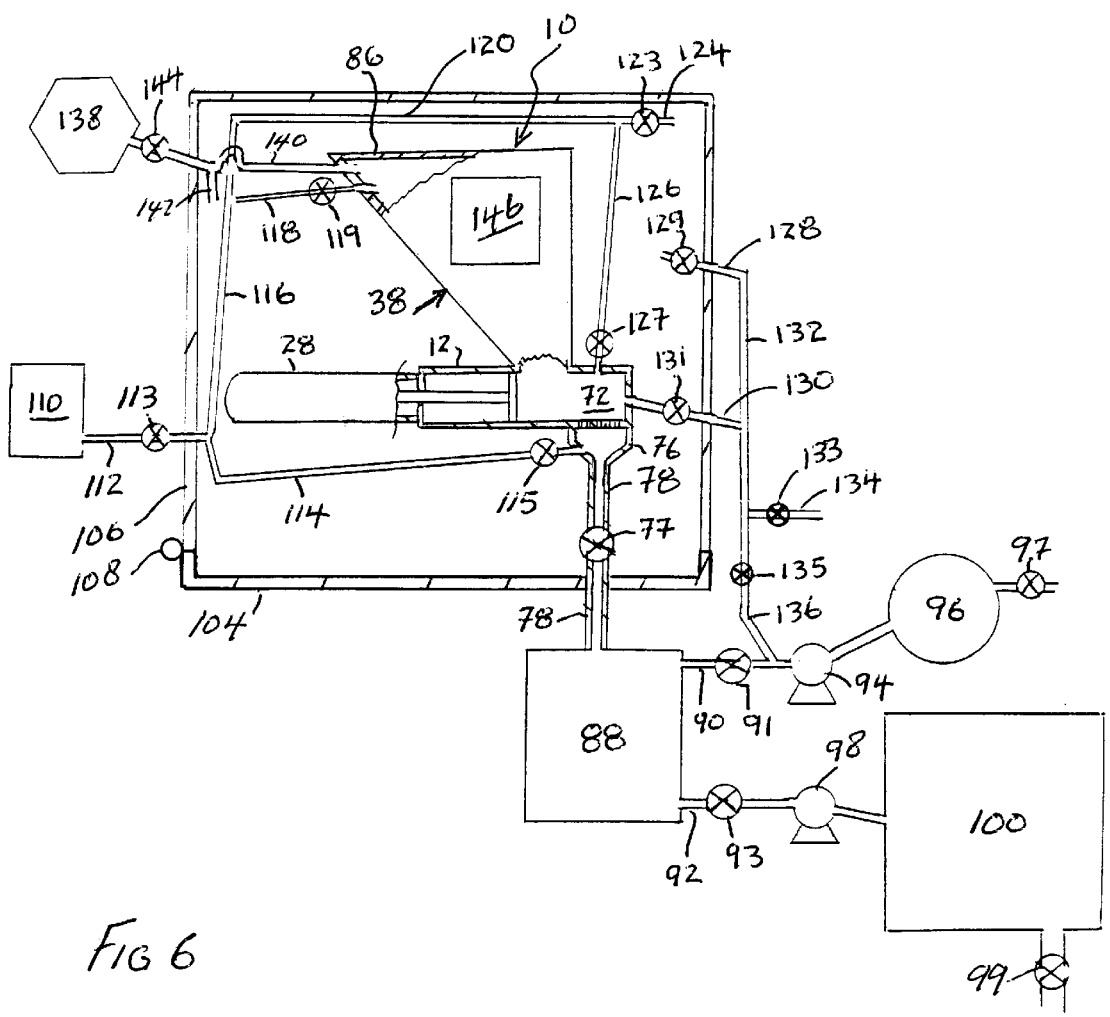
FIG. 6 is a schematic flow diagram showing the system for handling materials which are discharged from the compaction chambers.

Reference is now made to FIG. 6 which schematically shows the exit conduit 78 in communication with a gas-liquid separator 88. The separator is a device which separates materials flowing into the separator via exit conduit 78 into gases for exit via gas exit conduit 90 and materials which are not gases for exit via liquid/solid exit conduit 92. The gas exit conduit may preferably have a pump-like device such as compressor 94 to draw off gases from the separator 88 and compress them for storage in a pressurized gas storage vessel 96. The liquid/solid exit conduit 92 may have some pump-like device such as a pump 98 to draw the liquid/solid material from the separator 88 for storage in a storage vessel 100. The pump 98 is to be selected having regard to the nature of the material and, for example, could comprise a pump for slurries or an auger and the like. Having regard to the nature of the flowable materials and the gas and/or solid/liquid fractions thereof, the materials extracted may be maintained under desired or advantageous conditions of temperature, pressure and/or inert atmosphere to facilitate handling and safety and the like. The separator 88 has been shown as merely splitting the flowable materials into two streams. It is to be appreciated that more than two streams could be provided. Similarly, rather than providing merely a single separator, a series of separation steps could be provided to separate and filter and subdivide as may be desired. Various shut off valves 77, 91, 93, 97 and 99 may be provided for advantageous control of the operation of the apparatus.

The preferred embodiment shows the hopper 38 as having a lid 86 to seal the hopper. This is particularly advantageous so that the totality of the compactor from the inlet to the hopper to the storage vessels are sealed and enclosed. In operation, movement of the ram 26 can shear containers and thereby release gases or other volatile or unpleasant materials from the containers into the hopper 38. With the apparatus of the present invention substantially sealed, it is particularly adapted for compacting and shearing of containers such as aerosol containers containing flammable materials. Such aerosol containers are well known to contain propane and other flammable gases as propellants. When these aerosol containers are not empty, they provide a substantial explosion and fire hazard. The apparatus permits the aerosol containers to be compacted and for the gases and other materials from within the aerosol containers to be separately recovered. As an enclosed system, the apparatus may be operated so as to reduce or eliminate atmospheric air or oxygen within the enclosed system and/or to have the enclosed system under any inert atmosphere. For example, a source of inert gas, such as nitrogen may be provided, for example, at elevated pressure. Preferably, the inert atmosphere is maintained within the apparatus at a positive pressure. The enclosed system may be provided with a system to purge the system of atmospheric air and hazardous gases before the enclosed system may be opened. The hopper may be provided with explosion doors to minimize any explosion or fire. The apparatus may provide not only a primary enclosure system but also a secondary enclosure system.

After containers 82 are placed into the hopper 38, the system can be enclosed as by closing the hopper lid and ensuring the remainder of the system is enclosed. Nitrogen may be delivered to the enclosed system and the gas compressor 94 operated to draw air from the system and substantially replace air within the system by nitrogen. Preferably, the system may be maintained under a positive pressure from nitrogen, for example, of about 1 to 3 psi. Once the nitrogen substantially fills the system, compaction and shearing with the ram 26 may be carried out with the compressor 94 operated to draw gases off and pump 98 operated as necessary to assist removal of liquid/solids. When the compaction chamber is full, prior to opening slide gate 40, the system can be again purged with additional nitrogen to draw off and evacuate any gases present for example in the hopper and guideway 24 before opening slide gate 40. The slide gate 40 can then be opened and the compacted containers pushed out of chamber 72. Subsequently, additional containers may be placed in the hopper the system can be closed and the process repeated.

Referring to FIG. 6, the apparatus 10 as illustrated in FIGS. 1 to 5, and defining a sealed primary enclosure therein, is shown within a secondary containment housing forming a sealed secondary enclosure. The secondary housing comprises a base 104 with a shroud 106 sealably connected thereto for opening by pivoting about hinge 108 to provide access to the apparatus. The secondary containment housing sealably encloses the apparatus 10.

A pressurized canister 110 of nitrogen gas is connected via various conduits to deliver nitrogen to various portions of the primary and secondary enclosures as desired. In this regard, a system of nitrogen gas supply conduits 112, 114, 116, 118, 120, 124 and 126 are provided with associated valves 113, 115, 119, 123 and 127. As schematically illustrated, conduit 114 delivers nitrogen to the collection manifold 76. Conduit 118 delivers nitrogen gas to the hopper. Conduit 124 delivers nitrogen gas to the inside of the secondary enclosure. Conduit 126 delivers nitrogen gas to the compaction chamber 72.

Gas exit conduits are shown as 128, 130, 132, 134 and 136 for exit of gas from the enclosures as controlled by valves 129, 131, 133 and 135. Conduit 128 permits gas to exit from the secondary enclosure. Conduit 130 permits gas to exit from the compaction chamber 72. Conduits 132 and 136 direct the gas to the conduit 90 leading to the compressor 94 permitting exit gas to be collected in the gas storage tank 96. Conduits 132 and 134 permit exit gases to be purged to the atmosphere as may be advantageous when merely air or nitrogen are being purged.

Preferably, the nitrogen purged system is adapted to maintain the enclosures at positive pressures. The positive pressures for the primary enclosure within the apparatus 10 could be relatively high pressures, for example, in the range of 1 pound to 14 pounds having regard to the construction of the various elements including notably the hopper. Positive pressure for the secondary enclosure likely is relatively low, possibly in the range of ¼ pound to 1 pound. As with any pressurized system, pressure relief valve should be provided to release excessive gas pressures from portions of the primary and secondary enclosures to avoid the failure under the excessive pressures.

FIG. 6 also shows a pressurized tank 138 providing a source of fire extinguishing material such as carbon dioxide which can be directed via conduits 140 and 142 under the control of valves, such as 144 to deliver fire extinguishing materials, for example, into the secondary enclosure and the hopper 38. Delivery of the fire extinguishing materials may be controlled as by sensors for flame and/or heat.

FIG. 6 shows the hopper 38 as having an explosion door 146 fixed to a side of the hopper 38 to releasably sealably enclose an opening in the side of the hopper in a known manner. The explosion door 146 is adapted for release when pressure in the hopper 38 exceeds a predetermined pressure to reduce explosion hazards.

To reduce risk of fire and explosion, various controls for the apparatus are preferably selected to the spark and explosion proof.

The invention of the present application also provides a method for compacting containers so as to separate flowable materials in the containers from the containers. In this regard, it is appreciated that an apparatus in accordance with the present invention may be operated in a batch manner in which at the beginning of the batch, shroud 106 and hopper cover 86 are both opened. Containers are placed in the hopper 38 and the shroud 106 and hopper cover 86 are closed. The system can now be purged of air by use of the nitrogen purge system. Once the primary and secondary enclosures have been purged as, for example, by purging for some period of time, the nitrogen purging is stopped. Nitrogen may still be delivered so as to provide a positive pressure in one or both of the primary and secondary enclosures. As well, it is possible that at all times during the operation, nitrogen purging can be continued in one or both of the primary and the secondary enclosures.

After the nitrogen purge, compaction and shearing with the ram 26 may be carried out with the compressor 94 operated to draw gases off and the pump 98 operated as necessary to assist removal of liquids/solids. After any step during operation, the system can again be purged by nitrogen to draw or evacuate any gases present. For example, when the compaction chamber is full, prior to opening the slide gate 40, the primary enclosure may be purged. The slide gate 40 can then be opened and compacted containers pushed out of the chamber 72 into the secondary enclosure. The slide gate 40 can then be closed and compaction and shearing with the ram further carried out until the hopper may be emptied. After the hopper may be emptied, then a new batch desired to be carried, before the shroud 106 or the hopper cover 86 are opened, it is preferred that both the primary and secondary enclosures be purged with nitrogen so to remove any gases.

While the invention has been described with reference to preferred embodiments, the invention is not so limited. For a definition of the invention, reference is made to the appended claims.

What is claimed is:

1. An aerosol can compacting apparatus for compacting pressurized aerosol containers containing flowable material, the apparatus comprising:

a housing having containment walls defining an elongate guideway therein having a forward end and a rear end, the guideway having a substantially uniform cross-sectional shape throughout its length, a ram member reciprocally movable longitudinally in the guideway between a forward extended position proximate the forward end and a rear retracted position proximate the rear end, the ram member having a cross-sectional shape corresponding to that of the guideway such that the ram member substantially seals the guideway against passage of flowable material in the guideway rearwardly pass the ram member, a feed opening through the containment walls into the guideway at a location immediate the forward end and the rear end such that when the ram member in the rear retracted position the feed opening is forward of the ram member, the feed opening permitting containers to be fed into the guideway, a shear mechanism comprising a fixed shear member located in the guideway proximate a forwardmost edge of the feed opening, the fixed shear member opposed to a forward end of the ram member whereby on movement of the ram member forwardly from the rear retracted position, the forwardmost edge of the ram member passes adjacent the fixed shear member to shear any containers which extend from the guideway out of the feed opening, the guideway forward of the feed opening comprising a compaction chamber, the containment walls about the compaction chamber having an array of small size openings which permit flowable materials from the containers to pass therethrough out of the compaction chamber yet substantially prevent containers or sheared parts of containers to pass therethrough, wherein with the ram member located within the compaction chamber, the compaction chamber forward of the ram member is substantially sealably enclosed but for the array of openings, the array of openings providing communication from the compaction chamber into an enclosed collection manifold outside the compaction chamber, the collection manifold in sealed communication with a sealed storage vessel via an outlet conduit, the ram member on movement forwardly in the compaction chamber adapted to compact containers therein and extrude flowable materials from the containers out of the compaction chamber via the array of openings into the collection manifold and out of the collection manifold via the outlet conduit to the storage vessel, a feed hopper having an outlet in sealed communication with the feed opening, the hopper having an inlet for feeding containers into the hopper, a door mechanism to sealably close the hopper inlet, the guideway having a charge volume defined within the guideway forward of the ram member when the ram member is in the rear retracted position, the hopper having a charge volume greater than the guideway charge volume, wherein with the door mechanism sealably closing the hopper inlet, a sealed compartment is defined within the hopper, the guideway, the collection manifold and the storage vessel.

2. An apparatus as claimed in claim 1 wherein the containment walls about the compaction chamber having a gated major exit opening for removal of containers which have been compacted, a gate movable between open and closed positions to sealably close the exit opening.

3. An apparatus as claimed in claim 2 including a hydraulic cylinder for moving the ram member between the fully extended and fully extracted positions.

4. An apparatus as claimed in claim 3 wherein the cylinder is located external to the housing, a ram activating rod extending through a rod opening in the containment walls connecting the ram to the cylinder, a seal member in the rod opening providing a seal between the rod and the containment walls, wherein with the gate sealably closing the exit opening, the containment walls forming a sealed enclosure open merely at the feed opening and the array of openings whereby any materials which may pass rearwardly in the guideway past the ram are kept sealably contained within the containment walls.

5. An apparatus as claimed in claim 4 wherein the containment walls include a rear wall, a front wall, a first side wall, a second side wall, a top wall and a bottom wall, the rod opening provided in the rear wall, and the feed opening provided in the top wall.

6. An apparatus as claimed in claim 5 wherein a first of the side walls about the compaction chamber having the gated major exit opening.

7. An apparatus as claimed in claim 6 including an ejection piston for movement from the second side wall reciprocally towards and away from the first side wall to inject containers which have been compacted in the compaction chamber from the compaction chamber when the exit opening is open, the ejection piston having a piston rod extending through a piston rod opening in the second side wall, a seal member in the piston rod opening providing a seal between the piston rod and the second side wall.

8. An apparatus as claimed in claim 7 wherein the ejection piston comprises a secondary ram reciprocally movable between the side walls to compress containers and/or flowable material within the compaction chamber.

9. An apparatus as claimed in claim 1 including a closure mechanism for sealably closing the feed opening.

10. An apparatus as claimed in claim 1 wherein the feed opening opens upwardly from the guideway, the feed hopper extends upwardly from about the feed opening to receive and direct containers received therein downwardly through the feed opening.

11. An apparatus as claimed in claim 1 including inert gas supply means to supply pressurized inert gas to the sealed compartment and a gas exit conduit to permit exit of gas from the sealed compartment.

12. An apparatus as claimed in claim in claim 1 including an explosion proof shroud enclosing the feed hopper, guideway and collection manifold.

13. An apparatus as claimed in claim 12 including a pressure relief door in a wall of the hopper which releases when pressures within the hopper exceed a predetermined pressure.

14. An apparatus as claimed in claim 1 including a one-way valve mechanism in the outlet conduit permitting flow from the collection manifold to the storage vessel, and a gas evacuation mechanism to evacuate gas from the hopper, the guideway and the collection manifold.

15. An apparatus as claimed in claim 14 including an inert gas supply to supply pressurized inert gas to the hopper, the guideway and the collection manifold.

* * * * *